Nov. 5, 1968 H. D. BAUM 3,409,110
ELECTRICALLY CONTROLLED ARTICLE VENDING MACHINE
Filed Dec. 26, 1967 3 Sheets-Sheet 1
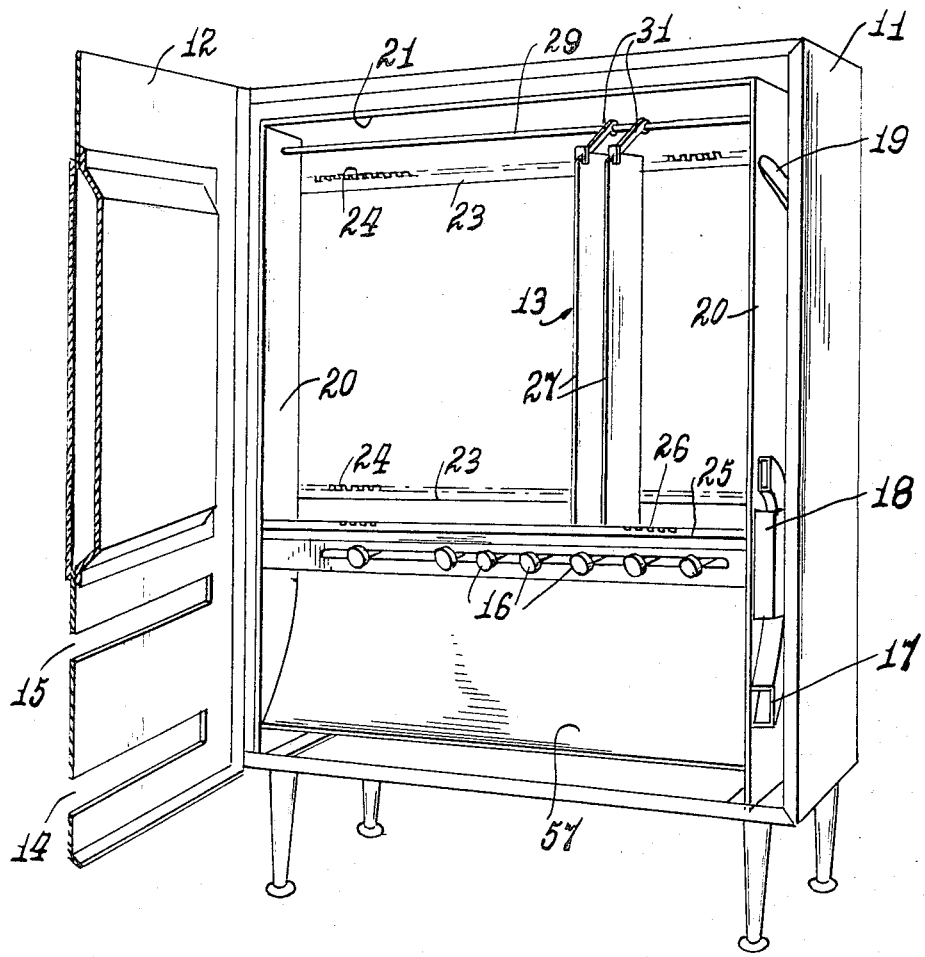
Fig. 1.
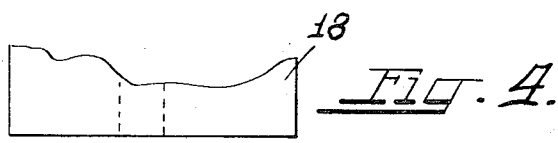
Fig. 4.
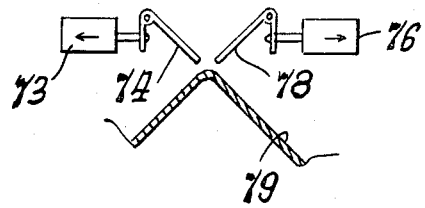
INVENTOR.
Harold D. Baum
Martin Fuer
Atty.

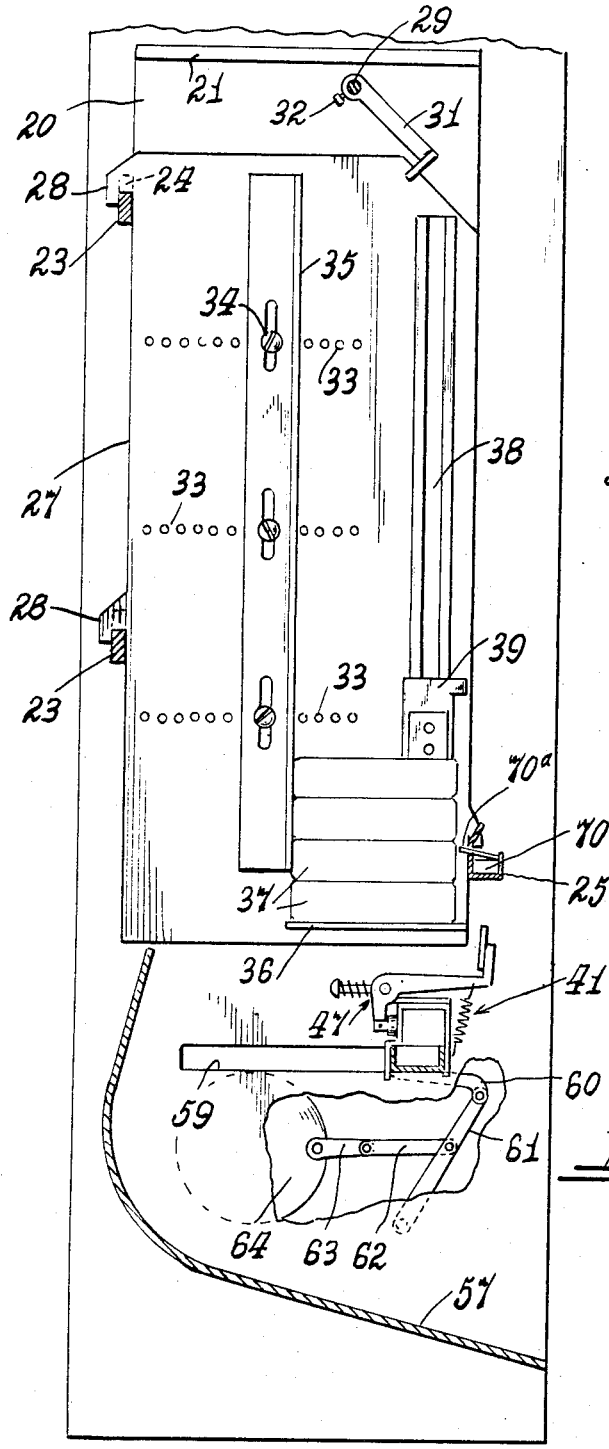
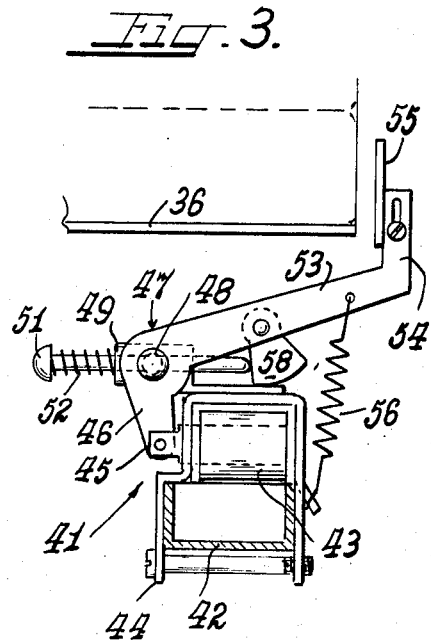
Fig. 3.
Fig. 2.
INVENTOR.
Harold D. Baum
Martin Fauer
Atty.

Nov. 5, 1968   H. D. BAUM   3,409,110
ELECTRICALLY CONTROLLED ARTICLE VENDING MACHINE
Filed Dec. 26, 1967   3 Sheets-Sheet 3

INVENTOR
Harold D. Baum
Martin Fauer
Atty.

United States Patent Office 3,409,110
Patented Nov. 5, 1968

3,409,110
ELECTRICALLY CONTROLLED ARTICLE VENDING MACHINE
Harold D. Baum, Skokie, Ill.
(6610 N. Clark St., Chicago, Ill. 60626)
Continuation-in-part of application Ser. No. 481,188, Aug. 20, 1965. This application Dec. 26, 1967, Ser. No. 693,587
10 Claims. (Cl. 194—10)

ABSTRACT OF THE DISCLOSURE

Merchandise vending apparatus of a kind having electrically controlled merchandise ejector mechanisms and manual push buttons controlling the selection of a specific mechanism, and wherein electrical means is provided to indicate when a specific merchandise hopper is empty and to cut off the supply of electric current to the related ejector mechanism.

---

This application is a continuation-in-part of my copending application Ser. No. 481,188, filed Aug. 20, 1965, United States Patent No. 3,360,091, issued Dec. 26, 1967.

The invention relates to improvements in electric vending machines and is more particularly concerned with a cabinet structure including a plurality of merchandise hoppers, arranged side by side and adapted to be easily and quickly adjustable as to size so as to accommodate merchandise packages of different size. Coincident with such adjustment of the hoppers are novel readily adjustable electrically operated merchandise ejector means which means are individually adjustable to adapt them to cooperate with merchandise packages of various thicknesses. Specifically, the merchandise hoppers are arranged vertically and are disposed to discharge merchandise from the bottom ends thereof.

It is therefore an object of the invention to provide merchandise vending apparatus of the character referred to.

Another object is to provide an electrically actuated vending apparatus with novel merchandise hoppers readily adjustable in size.

Another object of the invention is to provide, in vending apparatus having size adjustable merchandise hoppers, novel electrically actuable merchandise ejector mechanisms associated one with each hopper.

Another object is to provide novel means for preventing operation of a selected merchandise ejector mechanism when the associated hopper is empty.

Another object is to provide a structure of the character referred to which is not difficult or expensive to manufacture, or to service, and which is very efficient in its operation and highly satisfactory in use.

The structure by means of which the above noted and other objects and advantages of the invention are attained will be described in the following specification, taken in conjunction with the accompanying drawings, showing a preferred illustrative embodiment of the invention, in which:

FIGURE 1 is an elevational view of the vending apparatus, showing the front door open.

FIGURE 2 is a vertical transverse sectional view of the apparatus, showing parts broken away.

FIGURE 3 is a detail elevational view of an ejector mechanism.

FIGURE 4 is a detail view of the coin receiving and retaining mechanism.

Figure 5:
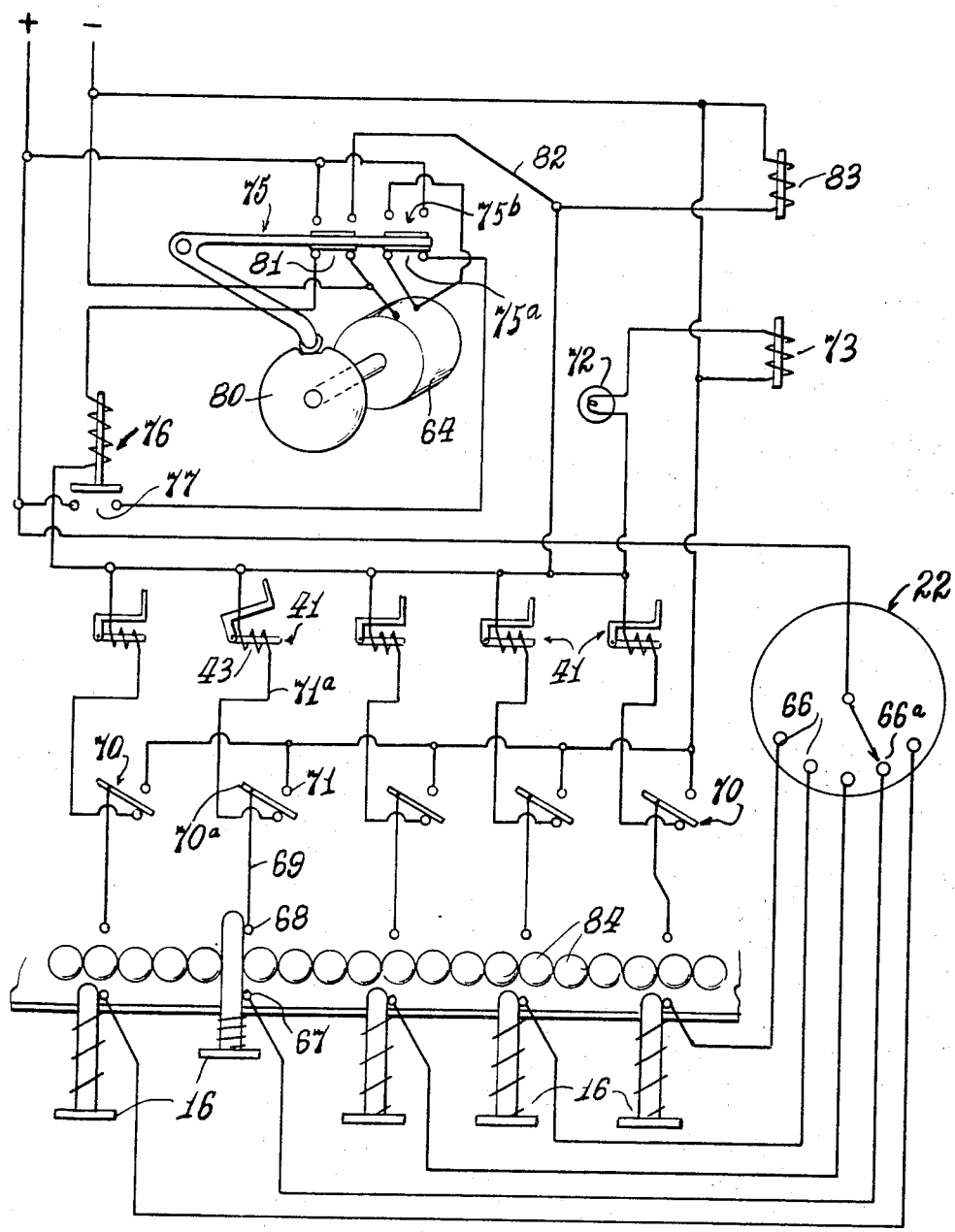
FIGURE 5 is a schematic view of the circuitry and the related components.

Referring to the exemplary disclosure of the invention shown in the accompanying drawings, and particularly as disclosed in the FIGURE 1 assembly, the apparatus is enclosed in an upstanding cabinet 11, having an open front normally closed by a door 12. When the door is in closed position, it overlies the open front of a series of merchandise hoppers 13. The front panel includes various apertures arranged to align with related components of the vending apparatus mounted within the cabinet. For example, there is provided in said door a horizontally elongated merchandise discharge opening 14 adjacent its lower edge and a horizontally extending slot 15 thereabove through which operating plungers 16 extend. The door also has openings that register with a coin return chute 17, a coin receiving opening in a coin rejector mechanism 18, and, at a high elevation, an opening through which a coin return operating lever 19 extends.

A frame structure consisting of upstanding end walls 20 and a top wall 21 is mounted firmly within the cabinet 11. It is to be noted, upon reference to FIGURE 1, that the right hand end wall 20 is spaced from the related end wall of the cabinet so as to afford space between them for mounting on the outside surface of said end wall, the coin rejector mechanism 18, and associated components to be described hereinafter. It is preferred that the coin rejector mechanism be of a type commercially made available by the National Rejectors, Inc., known as number 13–03 Series, Mechanical Accumulator. Such mechanism is designed to accept 5¢, 10¢, and 25¢ coins in any sequence or combination, and thus it is especially suited for use in the herein described apparatus, which is intended to dispense merchandise having values of from 5¢ to $1.50.

Generally, the rejector mechanism, which includes an accumulator, has select paths for coins which, in passing therethrough, function to release a trip mechanism that imparts stepped rotation to a stepper switch mechanism 22 (see FIGURE 5) connected in the circuitry of the the several ejector mechanisms.

Still referring to FIGURES 1 and 2, a pair of transverse bars 23, bridge the end walls 20 at the back side of the frame structure, one near the top and the other midway its heighth. Each of these bars has on its upper edge a series of mutually spaced apart notches 24. A lower bar or angle 25 bridges the front edges of said end walls 20, and this bar or angle likewise has similarly spaced apart notches 26 on its rearwardly facing edge.

The bars 23 and 25 are provided to afford support means for a series of vertical walls 27 which are arranged side by side as to provide a series of upstanding merchandise hoppers 13. Since it is one of the features of this invention to provide hoppers of varying widths, the vertical walls are adjustably positioned on said bars. To this end, the back edge of each wall 27 (only two are shown) is formed with a pair of hook-like formations 28 that are selectively engaged in the vertically aligned notches 24 in said bars 23. The lower front end of each wall is seated in a related notch 26 in the angle 25. In order to secure the upper front corners of walls 27, there may be provided in the area above said walls a transverse rod 29 anchored at its ends in the end walls 20 which rod carries a series of forks 31, each of which is engaged over the upper margin of a wall 27, as best shown in FIGURE 2. These forks are adjustable longitudinally along the rod 29 to conform to the spacing of said walls, and they may be secured against displacement by set screws 32. It will thus be apparent that when access is gained to said walls upon opening the front door 12, said walls 27 may be easily and quickly repositioned in different relation to one another as to provide merchandise hoppers of the desired widths.

Because the length of different packages of merchandise may vary, the hopper walls 27 are provided with vertically spaced apart horizontal rows of apertures 33 which afford means to receive attaching screws 34 for securing back stop flanges 35 thereto. A support flange 36 is also provided at the bottom of each hopper wall 27, upon which the lowermost package of merchandise in a hopper rests, and the spacing of back stop flange 35 from support flange 36 may be varied to accommodate merchandise packages of varying depth by the slotted mounting of attaching screws 34 in the back stop flange.

Each hopper wall 27 also has on its front edge coextensive with its length a T-shaped track 38 along which is slidably guided a follower weight 39 (see FIGURE 2) intended to rest on the uppermost package of merchandise in the hopper. This weight also constitutes means for cutting off the supply of electric current to ejector mechanism controls, to be described presently, when the last package of merchandise in a hopper has been dispensed, so as to prevent operation of the related ejector mechanism 41.

The ejector mechanisms 41, best shown in FIGURE 3, are arranged in the frame 20–21 below the merchandise support flanges 36, one for each hopper 13. These mechanisms are alike and are carried for longitudinal adjustment on a transverse bar or channel 42. Specifically, each ejector mechanism 41 includes a solenoid 43 secured in adjusted position on the channel 42, as by means of a strap bracket 44. The core 45 of each solenoid is disposed horizontally, and is connected to one arm 46 of a bell-crank lever 47 journalled at 48 in a hub 49 that has a guide rod 51 slideable therethrough. A spring 52 on said rod normally urges the rod 51 toward the rear of the apparatus.

The other arm 53 of bell-crank lever 47 extends forwardly from pivot 48 and terminates in an upstanding end portion 54, which carries a vertically adjustable pusher plate 55 that is normally disposed below the path of the lowermost package of merchandise in the related hopper. The adjustment is to accommodate packages of different thickness. A spring 56 normally holds the arm 53 depressed, as shown in FIGURE 2. The structure is such that when the solenoid 43 is energized, the lever arm 53 is elevated, as shown in FIGURE 3, to locate its pusher plate 55 in the path of the article of merchandise, so that when the assembly is advanced toward the rear of the apparatus, in a manner to be described presently, the pusher plate will push the piece of merchandise off of the support flange 36 and drop it into a delivery chute 57 for delivery to the customer through door opening 14.

In order to hold the lever arm 53 elevated after momentary energization of solenoid 43, there is provided thereon a latch 58 that falls into a vertical position to rest upon the top of the solenoid strap. At the termination of a vending stroke, the rod 51 strikes a stop, such as the wall of chute 57, and is displaced forwardly to strike and displace the latch 58, whereupon the spring 56 pulls the arm 53 downwardly into its at rest position.

Such ejection movement of the ejector mechanism is effected through reciprocation of the channel 42. As shown in FIGURE 2, the channel rides at its ends in a track 59 and it carries an arm 60 that is connected to one end of a pivoted link 61 that is pivotally connected by like link 62 to an eccentric arm 63, driven by a motor 64. Thus, when the apparatus is conditioned to vend a piece of merchandise, the motor operates through one cycle to advance the channel and components carried thereby toward the rear of the apparatus.

The operation of the apparatus may best be understood upon reference to FIGURE 5, which for purposes of illustration shows the control mechanism for five hoppers, although more or less may be provided. When a coin or coins is deposited into the coin rejector mechanism 18, said mechanism operates in a conventional manner to rotate a stepper switch 22 which is thereby set to make electrical contact with the corresponding terminal 66a of a series of terminals 66 thereon, said terminals being representative of the value of the coin or coins deposited. In the example shown it is assumed that 20¢ has been deposited to obtain a piece of merchandise valued at 20¢. This contact delivers electric current to a terminal 67 associated with the plunger 16 associated with a column of merchandise having a value of 20¢. The plunger, which is spring returned, is then manually depressed by the customer, closing a circuit between the terminal 66a and a related terminal 68. Terminal 68 is connected by a lead 69 to a normally closed "hopper empty" switch 70 that is mounted in the channel 25 (see FIGURE 2). As shown in said figure and in FIGURE 5, this switch is opened when the related hopper is empty, by reason of the follower 39 dropping down and actuating a detent lever 70a thereon. When the hopper is empty, said switch 70 closes a circuit through contact 71 to activate an "empty" light 72 suitably located on the machine cabinet to indicate to the customer that the selected hopper is devoid of merchandise. At the same time a coin refund solenoid 73 is energized to return the deposited coin or coins to the customer. Further, the circuit through contact 71 operates the stepper switch relay reset 83 to extract credit from the stepper switch 22. Also, as shown in FIGURE 4, this solenoid 73 actuates a selector gate 74, leading to the coin return chute 17. Thus, should the hopper be empty, the main circuit is interrupted by switch 70.

However, assuming the hopper to contain merchandise, and the switch 70 thereof being closed, current from said switch flows through a lead 71a to the related solenoid 43 to raise the lever arm 53 into merchandise engaging position. Current also flows to a coin acceptance solenoid 76 which is then energized to close a switch 77 to the motor 64. The motor circuit includes a cam actuated switch 75 which normally closes the motor circuit through terminal 75a. When the motor starts, the switch 75 is reversed to close the circuit through switch contact 75b to continue motor operation after switch 77 opens. The solenoid 76 also actuates a coin acceptance gate 78 (see FIGURE 4) to allow the coin or coins to drop through a chute 79 into a receptacle, not shown. The motor 64 now operates one cycle to advance the ejector mechanism 41, whereupon an article of merchandise is discharged. Following this cycle of operation, a cam 80 carried on the shaft of said motor operates to reverse switch 75 and cut off all current to the apparatus operating mechanism, and to feed current through terminals 81 and line 82 to the stepper switch reset relay 83. The apparatus is now reset to receive additional coins for successive operation.

In order to prevent repeat operation or multiple selection of a plurality of plungers 16, there is associated with the plungers stop blocks or balls 84 which function to permit depression of but one plunger at a time. Should it be desired to vary the vending value of any hopper or set two or more hoppers to vend at the same value, it is only necessary to move the lead between contact 66a and contact 67 to another of contacts 66 representing the desired value.

Although I have described a preferred embodiment of the invention in considerable detail, it will be understood that the description thereof is intended to be illustrative, rather than restrictive, as details of the structure may be modified or changed without departing from the spirit or scope of the invention. Accordingly, I do not desire to be restricted to the exact construction described or shown.

I claim:

1. In a vending machine, a plurality of hoppers for containing columns of articles to be vended, said hoppers being adjustable in width to accommodate articles of different sizes, a plurality of dispensing mechanisms, a carrier common to all of said dispensing mechanisms, means to adjust the dispensing mechanisms along said carrier to locate one beneath each hopper, an electric circuit, electrical means in said circuit operable when momentarily energized to condition a select dispensing mechanism to engage and eject an article of merchandise when actuated, a coin controlled stepper switch in said circuit, and manually operated plunger actuated switches in said circuit selectively operable to close the circuit to one of said electrical means in response to setting of the stepper switch, and means to actuate said selected dispensing mechanism to eject an article.

2. The vending machine recited in claim 1, in which means is provided to retain the selected dispensing mechanism in merchandise engaging position after current to the electrical means is interrupted.

3. The vending machine recited in claim 1, in which a coin rejector mechanism is operable to set the stepper switch.

4. The vending machine recited in claim 1, in which the means to actuate said selected dispensing means comprises an electric motor.

5. The vending machine recited in claim 1, in which each dispensing mechanism is adjustable to adapt it to cooperate with articles of different dimensions.

6. In a vending machine including a plurality of merchandise hoppers arranged side by side, said hoppers being adjustable in width, a plurality of merchandise ejector mechanisms, a common carrier for said ejector mechanisms, said ejector mechanisms being adjustable along said carrier so as to be positionable one below each hopper, each ejector mechanism comprising a solenoid, lever means operable when said solenoid is energized to move into the path of an article of merchandise, in a related hopper, and means operable to actuate the carrier to cause the lever means to eject an article from the hopper.

7. A vending machine of the character recited in claim 6, in which coin controlled means is provided to control the flow of current to a selected solenoid.

8. A vending machine of the character recited in claim 6, in which manually operated switches are provided to complete the circuit to the selected solenoid.

9. A vending machine of the character recited in claim 6, in which means is provided to interrupt the circuit to a selected solenoid when the related hopper is empty of merchandise.

10. In a vending machine having a plurality of hoppers, a plurality of electric means selectively operable to effect the discharge of merchandise from a selected hopper, a normally closed switch in the circuit to each electric means, and follower means responsive to the vending of the last piece of merchandise from a hopper to open the circuit to the electric means.

References Cited

UNITED STATES PATENTS 3,174,646   3/1965   Johnson _____ 221—129
3,319,822   5/1967   Ovsienko _____ 221—129

STANLEY H. TOLLBERG, *Primary Examiner.*